No. 803,107. PATENTED OCT. 31, 1905.
I. KITSEE.
TRANSMISSION OF ELECTRIC CURRENTS.
APPLICATION FILED MAY 20, 1904.
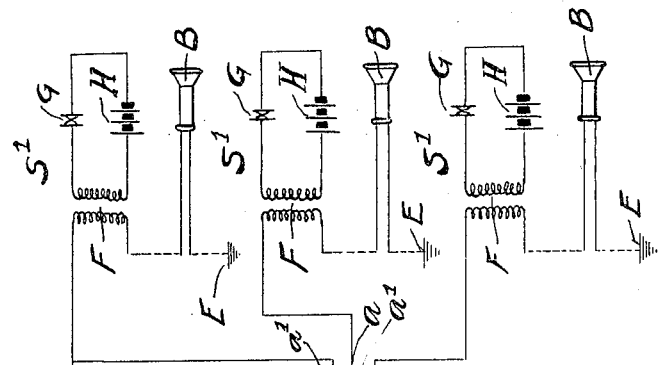
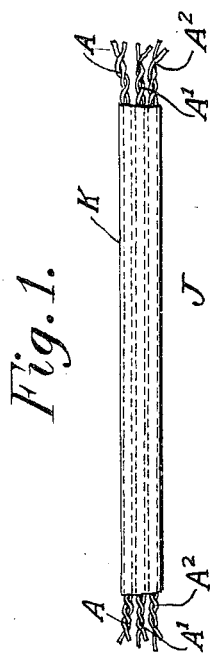
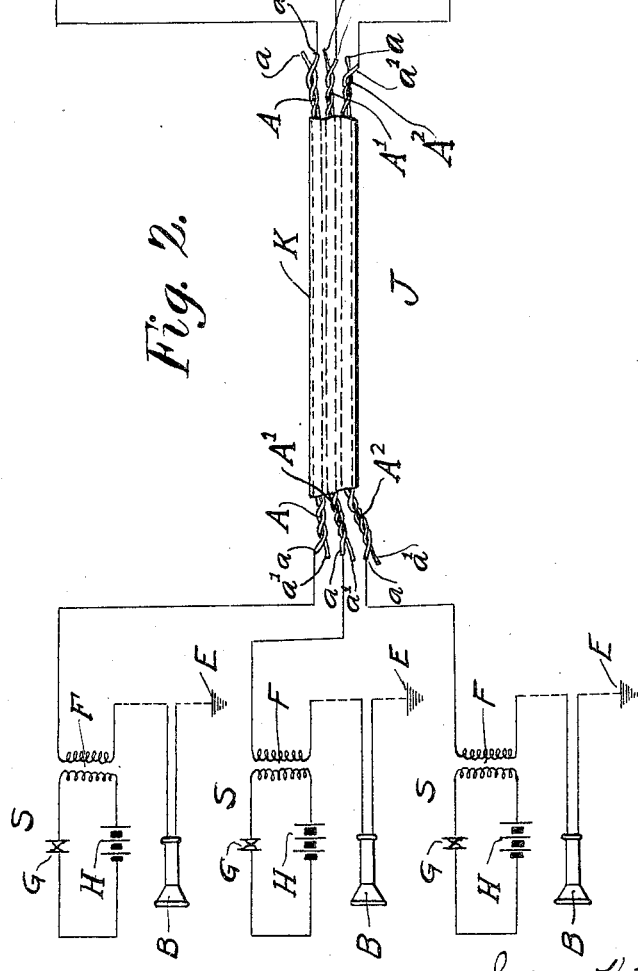
Fig. 1.
Fig. 2.
Witnesses
A. N. Cramer.
Edith P. Stilley.
Inventor
Isidor Kitsee
by Cornelius D. Ehret
his Attorney

UNITED STATES PATENT OFFICE.

ISIDOR KITSEE, OF PHILADELPHIA, PENNSYLVANIA.

TRANSMISSION OF ELECTRIC CURRENTS.

No. 803,107. Specification of Letters Patent. Patented Oct. 31, 1905.

Application filed May 20, 1904. Serial No. 208,872.

*To all whom it may concern:*

Be it known that I, ISIDOR KITSEE, of the city and county of Philadelphia, State of Pennsylvania, have invented certain new and useful Improvements in Transmission of Electric Currents, of which the following is a specification.

My invention relates to a system for the transmission over long distances of fluctuating or varying electric currents or current impulses, and particularly such complex currents as are characteristic of telephony, though my invention is equally applicable to telegraphy, and other arts.

My invention resides in a disposition of conductors or wires forming the medium for communication between two stations, such conductors or wires being adapted to be inclosed in or to constitute a part of a cable, either aerial, subterranean, or submarine.

My invention resides particularly in a disposition and arrangement of the conductors or wires as employed in a cable system. Each conductor or wire of the cable is a composite conductor forming a line or side of a circuit, such conductor being composed of a plurality of wires conductively independent, but inductively related in virtue of the twisting together of such wires throughout the entire or a considerable part of the distance between two stations.

My invention resides in the features and arrangements hereinafter described, and pointed out in the claims.

For an illustration of several of the numerous forms my invention may take reference is to be had to the accompanying drawings, in which—

Figure 1 is a view of a fragment of a cable containing three composite line conductors, each conductor consisting of two wires. Fig. 2 is a diagrammatic view of a cable system involving my invention.

Referring to Fig. 1, J represents a fragment of a cable, of which K is the envelop or jacket. A, A', and $A^2$ represent three independent composite conductors, lines, or sides of circuits, such as A in Figs. 1 and 2. These lines A, A', and $A^2$ are disposed within the cable practically parallel to each other and without twisting or braiding about each other. Each of these lines is a composite conductor made of insulated wires or conductors inductively related to each other and conductively independent of each other.

Referring to Fig. 2, J is a cable having, for example, three composite conductors or lines A, A', and $A^2$. Each of these composite conductors consists of a pair of insulated conductors $a$ and $a'$, twisted into close and intimate relation with each other throughout their lengths, so as to constitute practically a mechanical unit. Such cable J may be buried in the earth or strung upon poles as an aerial cable or laid as a submarine cable. Three stations S' are shown at the right, and three stations S are shown at the left. The instruments at each station consist of the induction-coil F, source of current H, transmitter G, telephone-receiver B, and earth connection E. A conductor or wire $a'$ of each composite conductor within the cable J is conductively connected at its right end with the instruments of a station, while at the left end of the cable it is free. Similarly, the conductor $a$ of each composite conductor within the cable J is conductively connected with an instrument at the left end and is left free at the opposite end of the cable. These three pairs of stations may communicate without interference from external sources or causing interference among themselves, the connection between the stations at one end of the cable with those at the other end of the cable being inductive as distinguished from conductive.

By the foregoing circuit arrangements more especially due to the composite conductor, line, or side of a circuit the transmission of speech becomes possible under conditions heretofore amounting to serious impediments in practice.

While not desiring to limit myself by a statement of theory, it is probable that the electrical action and behavior of the composite conductor is dependent upon electrostatic capacity, mutual electromagnetic induction, and self-induction.

What I claim as new, and desire to secure by Letters Patent of the United States, is—

1. A cable comprising a plurality of independent composite line conductors, each composite conductor comprising conductively-independent conductors twisted together throughout their lengths.

2. A cable comprising a plurality of composite line conductors, each composite conductor comprising conductively-independent conductors intimately associated with each other in twisted relation as a mechanical unit.

3. In combination, a plurality of separated telephone-stations, a cable extending between said stations and comprising composite line conductors, each line conductor connecting a pair of stations and comprising conductively-independent conductors twisted together throughout their lengths, each conductor being connected to a station and having its opposite end free.

In testimony whereof I hereby sign my name, in the presence of two subscribing witnesses, this 19th day of May, A. D. 1904.

ISIDOR KITSEE.

Witnesses:
    EDITH R. STILLEY,
    H. C. YETTER.